(12) United States Patent
Strnad et al.

(10) Patent No.: US 8,408,599 B2
(45) Date of Patent: Apr. 2, 2013

(54) GUIDE LOOPS FOR A SEAT BELT SYSTEM

(75) Inventors: George J. Strnad, Rochester, MI (US); Steven J. Richter, St. Clair Shores, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 534 days.

(21) Appl. No.: 12/560,753

(22) Filed: Sep. 16, 2009

(65) Prior Publication Data

US 2011/0062696 A1 Mar. 17, 2011

(51) Int. Cl.
B60R 22/24 (2006.01)

(52) U.S. Cl. ............... 280/801.1; 280/801.2; 280/808

(58) Field of Classification Search ........... 280/801.1, 280/801.2, 808; 497/483
See application file for complete search history.

(56) References Cited

U.S. PATENT DOCUMENTS

| | | | | | |
|---|---|---|---|---|---|
| 2,319,557 | A | * | 5/1943 | Ritz-Woller | 248/279.1 |
| 2,855,215 | A | * | 10/1958 | Sheren | 280/801.1 |
| 3,127,652 | A | * | 4/1964 | Springer | 24/165 |
| 3,981,052 | A | | 9/1976 | Pilarski | |
| 4,005,904 | A | | 2/1977 | Weman et al. | |
| 4,502,710 | A | * | 3/1985 | Takada | 280/804 |
| 4,549,769 | A | | 10/1985 | Pilarski | |
| 4,556,255 | A | * | 12/1985 | Kawai | 280/808 |
| 4,642,853 | A | | 2/1987 | Plesniarski et al. | |
| 4,676,556 | A | * | 6/1987 | Yamanoi et al. | 297/473 |
| 4,695,076 | A | * | 9/1987 | Hane | 280/804 |
| 4,729,581 | A | * | 3/1988 | Ono | 280/801.2 |
| 4,762,338 | A | | 8/1988 | Hayden | |
| 4,776,611 | A | * | 10/1988 | Tamura et al. | 280/801.2 |
| 4,834,427 | A | * | 5/1989 | Takada | 280/801.2 |
| 4,880,254 | A | * | 11/1989 | Muller | 280/801.2 |
| 4,917,210 | A | * | 4/1990 | Danicek et al. | 180/268 |
| 5,149,135 | A | * | 9/1992 | Konishi et al. | 280/806 |
| 5,163,707 | A | * | 11/1992 | Watanabe et al. | 280/801.2 |
| 5,207,452 | A | * | 5/1993 | Collins | 280/801.1 |

(Continued)

FOREIGN PATENT DOCUMENTS

| | | |
|---|---|---|
| DE | 3621380 A1 | 1/1988 |
| DE | 19940852 A1 | 3/2000 |
| DE | 102004058374 A1 | 6/2006 |
| DE | 102008045647 A1 | 3/2009 |

OTHER PUBLICATIONS

Office Ation of the German Patent Office for German Patent Application No. 102010036230.1, mailed on Aug. 10, 2012.

*Primary Examiner* — Joseph Rocca
*Assistant Examiner* — Barry Gooden, Jr.
(74) *Attorney, Agent, or Firm* — Quinn Law Group, PLLC (57) ABSTRACT

A guide loop for a vehicle seat belt system includes a first portion configured for attachment to a body of a vehicle in one plane and a second portion extending from the first portion at an angle and configured for attachment to the body in another plane. The guide loop is fixedly attachable to and not rotatable with respect to the body. In another embodiment, the guide loop includes a third portion extending from the second portion and substantially parallel to the first portion. The third portion is spaced apart from the first portion prior to attachment to the body so as to define a channel that is configured for receiving a seat belt webbing. A guide loop for a vehicle seat belt system including a height adjuster includes a loop portion and a stop portion, and is fixedly attachable to and not rotatable with respect to the height adjuster.

5 Claims, 5 Drawing Sheets

U.S. PATENT DOCUMENTS

| | | | |
|---|---|---|---|
| 5,280,959 A * | 1/1994 | Nanbu | 280/808 |
| 5,333,905 A | 8/1994 | Watanabe | |
| 5,372,382 A * | 12/1994 | Whitens | 280/808 |
| 5,390,977 A | 2/1995 | Miller | |
| 5,393,098 A | 2/1995 | Thomas et al. | |
| 5,415,430 A * | 5/1995 | Valasin | 280/801.1 |
| 5,415,433 A | 5/1995 | Pfeiffer | |
| 5,516,148 A * | 5/1996 | Ohira | 280/808 |
| 5,529,344 A | 6/1996 | Yasui et al. | |
| 5,590,907 A * | 1/1997 | McQueen et al. | 280/801.1 |
| 5,601,311 A | 2/1997 | Pfeiffer et al. | |
| 6,033,030 A | 3/2000 | Valasin | |
| 6,234,529 B1 * | 5/2001 | Ellison et al. | 280/808 |
| 6,250,681 B1 * | 6/2001 | Takahashi et al. | 280/805 |
| 6,276,720 B1 * | 8/2001 | Saito et al. | 280/801.2 |
| 6,287,060 B1 * | 9/2001 | Girardin | 410/7 |
| 6,478,334 B1 | 11/2002 | Desmarais et al. | |
| 6,485,055 B1 * | 11/2002 | Swayne et al. | 280/801.1 |
| 6,644,692 B2 * | 11/2003 | Kang | 280/801.1 |
| 6,702,327 B2 * | 3/2004 | Janz | 280/808 |
| 6,860,671 B2 | 3/2005 | Schulz | |
| 6,935,701 B1 | 8/2005 | Arnold et al. | |
| 7,080,856 B2 | 7/2006 | Desmarais et al. | |
| 7,118,133 B2 * | 10/2006 | Bell et al. | 280/806 |
| 7,131,669 B2 * | 11/2006 | Morita et al. | 280/808 |
| 7,156,198 B2 * | 1/2007 | Nishide et al. | 180/273 |
| 7,198,300 B2 | 4/2007 | Daume et al. | |
| 7,357,436 B2 * | 4/2008 | Willing et al. | 296/65.03 |
| 7,475,922 B2 * | 1/2009 | Ottino et al. | 292/216 |
| 7,607,697 B2 * | 10/2009 | Esler et al. | 280/801.1 |
| 7,635,167 B2 * | 12/2009 | Okazaki | 297/483 |
| 2002/0043839 A1 * | 4/2002 | Hirota | 297/253 |
| 2004/0227341 A1 * | 11/2004 | Hattori | 280/801.1 |
| 2006/0113786 A1 * | 6/2006 | Desmarais et al. | 280/801.2 |
| 2007/0241549 A1 | 10/2007 | Boelstler et al. | |
| 2007/0273138 A1 * | 11/2007 | You | 280/801.1 |
| 2008/0030013 A1 * | 2/2008 | Burghardt | 280/808 |
| 2008/0136141 A1 | 6/2008 | Gray | |
| 2008/0136156 A1 * | 6/2008 | Haas et al. | 280/801.1 |
| 2008/0288141 A1 | 11/2008 | Clute | |
| 2010/0032967 A1 * | 2/2010 | Otsuka | 292/240 |
| 2010/0194089 A1 * | 8/2010 | Ito et al. | 280/801.2 |

* cited by examiner

GUIDE LOOPS FOR A SEAT BELT SYSTEM

TECHNICAL FIELD

The present invention generally relates to seat belt systems, and more specifically, to a guide loop for a seat belt system.

BACKGROUND OF THE INVENTION

A seat belt restrains an occupant of a vehicle by distributing a force required to stop the vehicle across multiple parts of the occupant's body. A seat belt system is generally connected to the vehicle at three points, and may include a lap belt portion for restraining the occupant's lower body, and a shoulder belt portion for restraining the occupant's upper body. A webbing of the shoulder belt portion generally extends from a retractor situated at a lower portion of a pillar of the vehicle, and slides through a guide loop, which may also be known as a D-ring or turning loop, to thereby extend down and across the occupant's upper body. Typically, the guide loop may be attached directly to the body of the vehicle at the pillar, or may be attached to the body of a height adjuster installed in the pillar.

The guide loop generally rotates to allow for occupant comfort during seat belt use. Rotatable guide loops also often require a large guide loop profile, which may affect vehicle trim design. Further, rotatable guide loops often include multiple components, and may contribute to increased vehicle manufacturing costs and increased rattle during operation of the vehicle.

SUMMARY OF THE INVENTION

A guide loop for a vehicle seat belt system includes a first portion configured for attachment to a body of a vehicle in one plane and a second portion extending from the first portion at an angle and configured for attachment to the body of the vehicle in another plane. The guide loop is fixedly attachable to and not rotatable with respect to the body of the vehicle.

In a second embodiment, the guide loop includes a third portion extending from the second portion and substantially parallel to the first portion. The third portion is spaced apart from the first portion prior to attachment to the body of the vehicle so as to define a channel that is configured for receiving a seat belt webbing of the vehicle.

In a third embodiment, the guide loop for a vehicle having a seat belt system including a height adjuster includes a loop portion and a stop portion. The loop portion is configured for receiving and slideably supporting a seat belt webbing, and the stop portion is configured for preventing rotation of the guide loop with respect to the height adjuster. The guide loop is fixedly attachable to and not rotatable with respect to the height adjuster.

The guide loops are not rotatable with respect to the body of the vehicle and/or the body of the height adjuster of the vehicle. However, the guide loops nonetheless maximize and improve occupant comfort while allowing for decreased friction between the guide loops and the seat belt webbing during refraction and/or extraction of the seat belt webbing. Therefore, the guide loops, with such improved comfort, encourage seat belt use by a vehicle occupant. The guide loops also optimize controlled retraction and/or extraction of the seat belt webbing, and allow the seat belt webbing to optimally distribute loads during load limiting events, such as a deceleration of the vehicle. Further, the guide loops allow for excellent closure to the trim of the vehicle, resist rattle during operation of the vehicle, and reduce vehicle manufacturing costs.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 2:
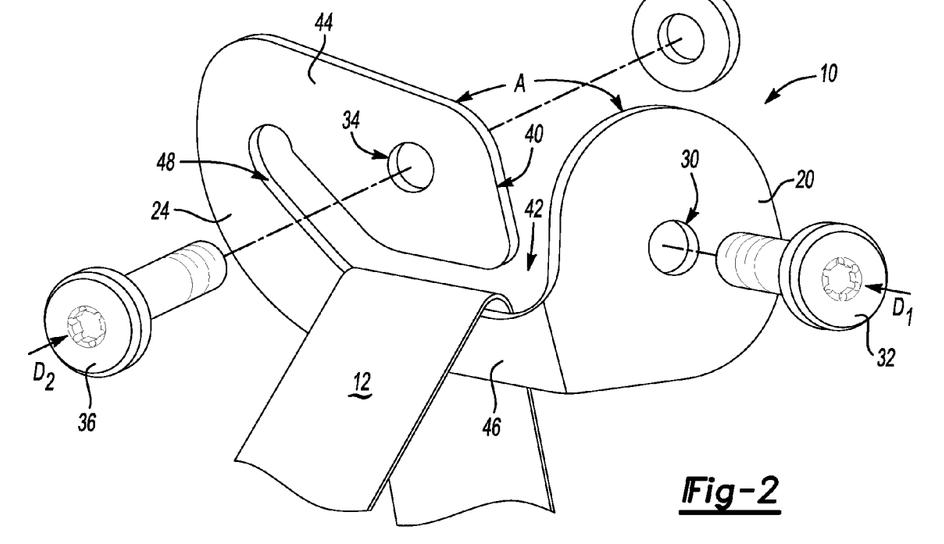
FIG. 2 is a schematic perspective view of a first embodiment of a guide loop of the present invention.

Referring to the drawings, wherein like reference numerals refer to like components, a guide loop for a vehicle seat belt system is shown generally at 10 in FIG. 2. The guide loop 10 is typically useful for automotive applications, such as seat belt systems. However, it is to be appreciated that the guide loop 10 may also be useful for non-automotive applications, such as, but not limited to, aviation and rail vehicles.

Figure 1:
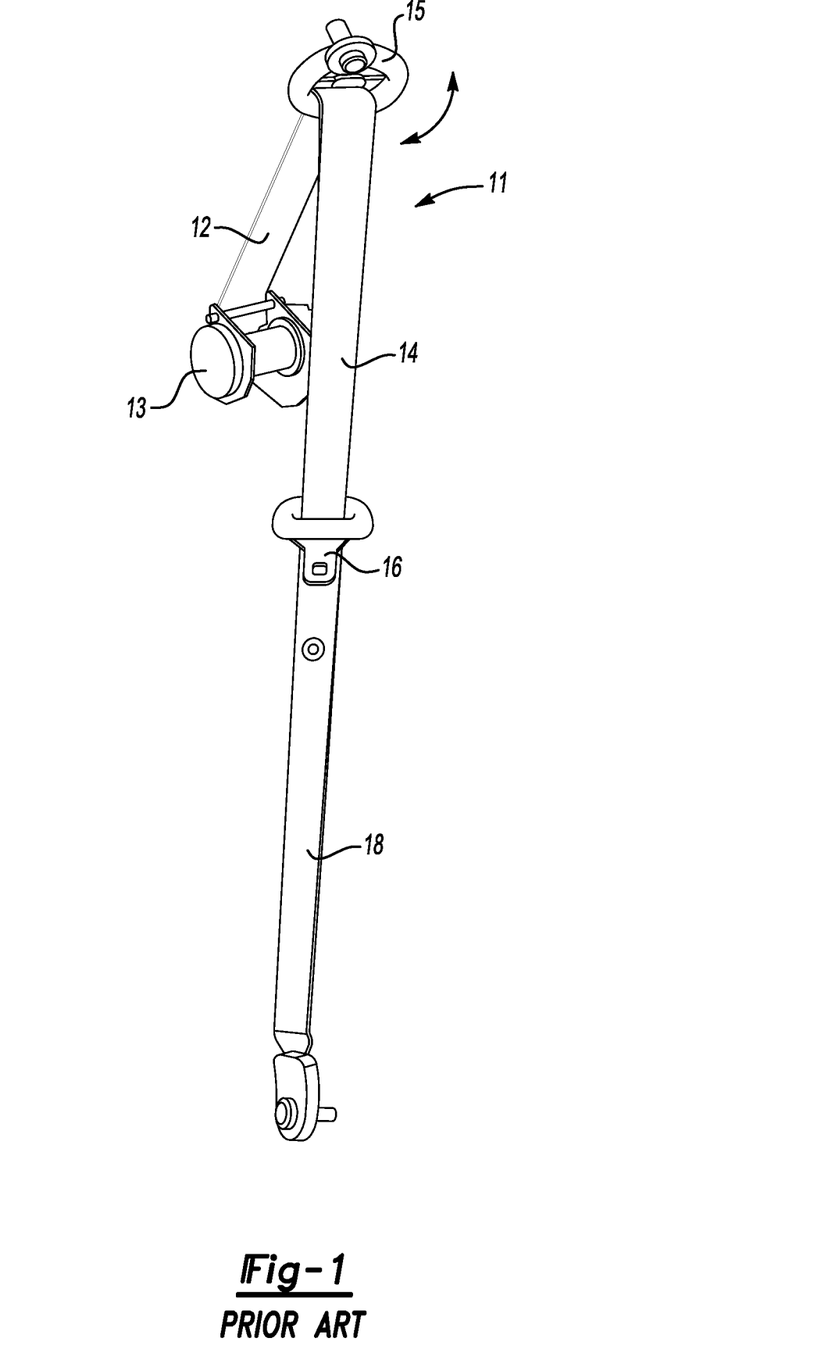
FIG. 1 is a schematic perspective view of a seat belt system including a guide loop of the prior art.

By way of general background explanation, and with reference to a conventional vehicle seat belt system shown generally at 11 in FIG. 1, a seat belt webbing 12 may extend from a retractor 13 disposed near a lower portion of a pillar (not shown) of a vehicle. For example, the retractor 13 may be disposed near a lower portion of a B-, C-, or D-pillar of the vehicle. The seat belt webbing 12 may then slide through a conventional guide loop 15 to thereby extend down and across an occupant's upper body (not shown) to form a shoulder belt portion 14 of the conventional seat belt system 11. To secure the seat belt webbing 12 for restraining the occupant of the vehicle, the occupant typically inserts a tongue latch 16 into a buckle (not shown), and thereby forms a lap belt portion 18 of the conventional vehicle seat belt system 11.

Figure 3:
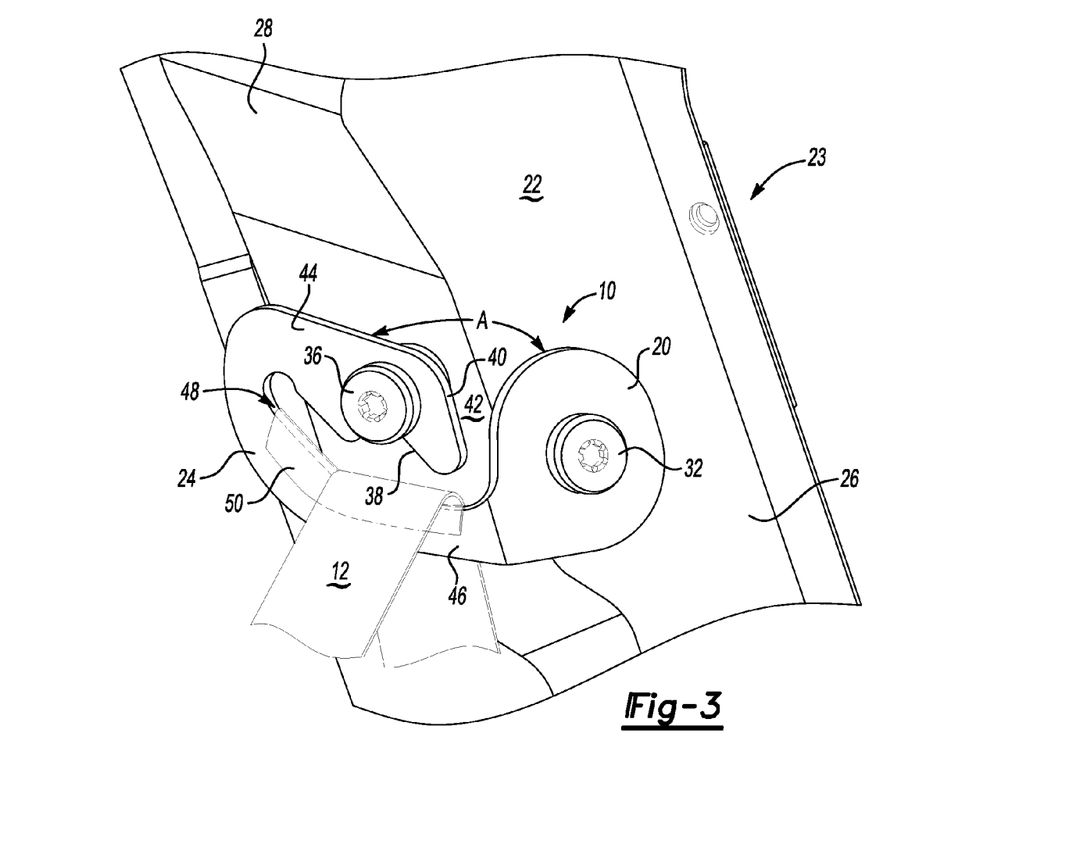
FIG. 3 is a schematic perspective view of the guide loop of FIG. 2 fixedly attached to a body of a vehicle.

Referring now to FIGS. 2 and 3, a first embodiment of a guide loop 10, which may also be known as a D-ring or turning loop, includes a first portion 20 configured for attachment to a body or pillar 22 (FIG. 3) of a vehicle 23 (FIG. 3) in one plane, and a second portion 24 extending from the first portion 20 at an angle, A, and configured for attachment to the body or pillar 22 (FIG. 3) of the vehicle 23 (FIG. 3) in another plane. That is, referring to FIGS. 2 and 3, one plane may be generally perpendicular to one direction, indicated by arrow $D_1$ in FIG. 2, and another plane may be generally perpendicular to another direction, indicated by arrow $D_2$ in FIG. 2. Further, the first portion 20 may be integral with the second portion 24 and may be configured to abut the body 22. For example, the first portion 20 may be crimped, e.g., bent, at the angle, A, to form the second portion 24. Referring to FIG. 3, the angle, A, may be selected according to a configuration of the body or pillar 22 of the vehicle 23. That is, the angle, A, may be selected so that the first portion 20 is fixedly attachable to a first surface 26 of the body 22 of the vehicle 23, and the second portion 24 is fixedly attachable to a second surface 28 of the body 22 of the vehicle 23.

Although shown as a rounded form in FIG. 2, it is to be appreciated that the first portion 20 of the guide loop 10 may have any shape. Moreover, as shown in FIG. 2, the first portion 20 may define at least one bore 30 therethrough that is configured for receiving a fastener, e.g., a first fastener 32. The first fastener 32 may be selected from any known fastener in the art. For example, the first fastener 32 may be selected from bolts, screws, nuts, washers, rivets, retaining rings, plugs, tacks, pins, snaps, studs, and combinations thereof. The guide loop 10 is fixedly attachable to the body 22 of the vehicle 23 via at least the first fastener 32, as set forth in more detail below. Therefore, the first portion 20 may be configured for preventing rotation of the guide loop 10 with respect to the body 22.

Likewise, referring to FIG. 2, the second portion 24 of the guide loop 10 may define at least one bore 34 therethrough that is configured for receiving a fastener, e.g., a second fastener 36. The second fastener 36 may also be selected from any known fastener in the art, as set forth above, and may be the same as or different from the first fastener 32.

Referring to FIG. 3, in a variation of the first embodiment, the second portion 24 may define at least one notch 38 that is configured for abutting the second fastener 36. That is, a section of the second portion 24 may be cut-away to form the notch 38 so that the second portion 24 may rest on the second fastener 36. The second portion 24 may include the notch 38 for positioning during vehicle assembly. For example, some vehicle assembly sequences may require the guide loop 10 to be first fixedly attached to the body 22 by the first fastener 32 and then be positioned to abut the second fastener 36 via the notch 38. In this variation, the second portion 24 may also be easily removed or spaced from the body 22 of the vehicle 23 to release the seat belt webbing 12 if necessary, e.g., for removal and/or servicing of the seat belt system.

Referring again to FIG. 3, the guide loop 10 is fixedly attachable to the body 22 of the vehicle 23, for example, by the first and second fasteners 32, 36. Therefore, in contrast to a conventional guide loop 15 (FIG. 1), the guide loop 10 is not rotatable with respect to the body 22 of the vehicle 23, as set forth in more detail below.

Referring now to FIGS. 2 and 3, a distal end 40 of the second portion 24 may be spaced apart from the first portion 20 to thereby define a channel 42 that is configured for receiving and releasing the seat belt webbing 12 of the vehicle 23. That is, during installation of a seat belt system in the vehicle 23, the seat belt webbing 12 may slide between the first portion 20 and the distal end 40 of the second portion 24 along a path indicated by the arrow in FIG. 2 before the guide loop 10 is fixedly attachable to the body 22 (FIG. 3) of the vehicle 23, i.e., before the first fastener 32 and the second fastener 36 are disposed in the respective bores 30, 34 (FIG. 3). Stated differently, the channel 42 provides an opening into which the seat belt webbing 12 may be inserted during vehicle assembly and removed for servicing thereafter.

Referring again to FIG. 2, the second portion 24 may define an upper arm 44 and a lower arm 46 that is spaced opposite and apart from the upper arm 44. It is to be appreciated that the resulting area between the upper arm 44 and the lower arm 46 is a continuation of the channel 42 that is defined by the first portion 20 spaced apart from the distal end 40 of the second portion 24. The second portion 24 may therefore be configured for defining an arcuate bearing surface 48 that is configured for slideably supporting the seat belt webbing 12. That is, in operation, the channel 42 receives the seat belt webbing 12 onto the arcuate bearing surface 48, and the seat belt webbing 12 is supported by, and slides over, the arcuate bearing surface 48. The seat belt webbing 12 may translate or glide easily along the entire length of the arcuate bearing surface 48 so as to optimize comfort of a vehicle occupant embraced by the seat belt webbing 12.

Since the guide loop 10 may be used in place of a conventional guide loop 15 (FIG. 1), a shape of the arcuate bearing surface 48 may be determined by estimating a swing arc of the conventional guide loop 15 during the extent of its pivotal rotation. That is, the conventional guide loop 15 may generally rotate fore and aft along a direction of travel of the vehicle 23 and define the swing arc as the conventional guide loop 15 rotates. The arcuate bearing surface 48 may be configured to substantially mimic the shape of the swing arc. Thus, the arcuate bearing surface 48 may be somewhat longer or shorter than the swing arc, and may have a somewhat similar or different curvature than the swing arc.

Referring to FIG. 3, in one example, the arcuate bearing surface 48 may include an element or covering 50 configured for minimizing sliding friction of the seat belt webbing 12 with respect to the arcuate bearing surface 48. The element 50 may be, for example, a U-shaped sleeve that is disposed along the arcuate bearing surface 48. The element 50 may be constructed of any known suitable material for minimizing sliding friction of the seat belt webbing 12, such as, but not limited to, plastic, metal, composites, and combinations thereof. The element 50 may also minimize wear of the seat belt webbing 12 during use by the occupant, since the element 50 slideably assists the seat belt webbing 12 as the seat belt webbing 12 slides over the arcuate bearing surface 48. The element 50 may also encourage seat belt use by the vehicle occupant, since sliding friction during refraction and/or extraction of the seat belt webbing 12 is minimized.

Figure 4:
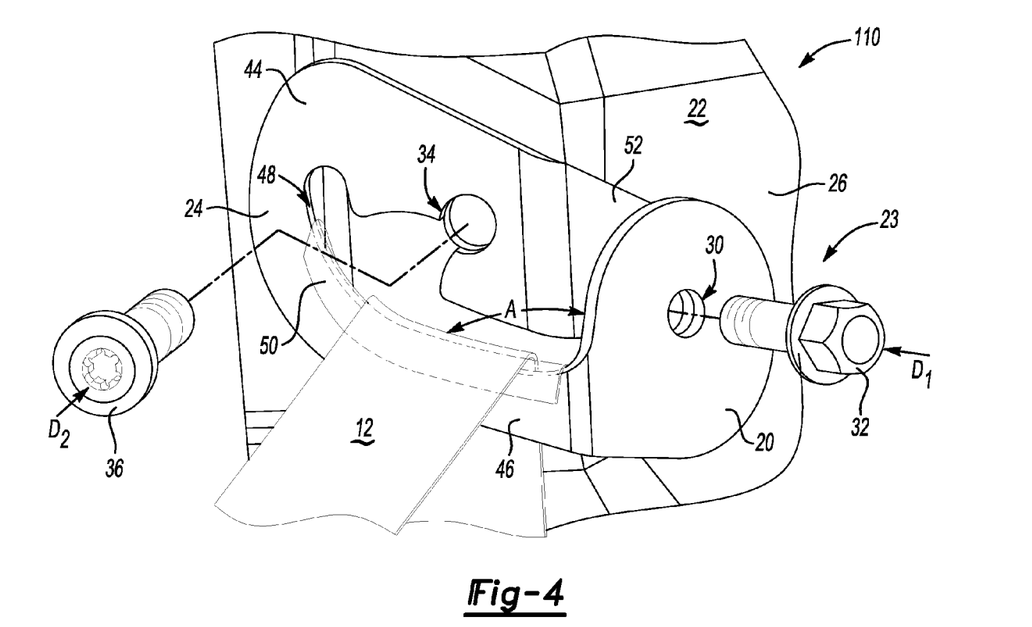
FIG. 4 is a first schematic perspective view of a second embodiment of a guide loop of the present invention.

Referring now to FIG. 4, a second embodiment of a guide loop is shown generally at 110. For this embodiment, the guide loop 110 also includes a first portion 20 configured for attachment to the body or pillar 22 of the vehicle 23. The guide loop 110 also includes a second portion 24 extending from the first portion 20 at the angle, A, and configured for attachment to the body or pillar 22 of the vehicle 23.

Figure 5:
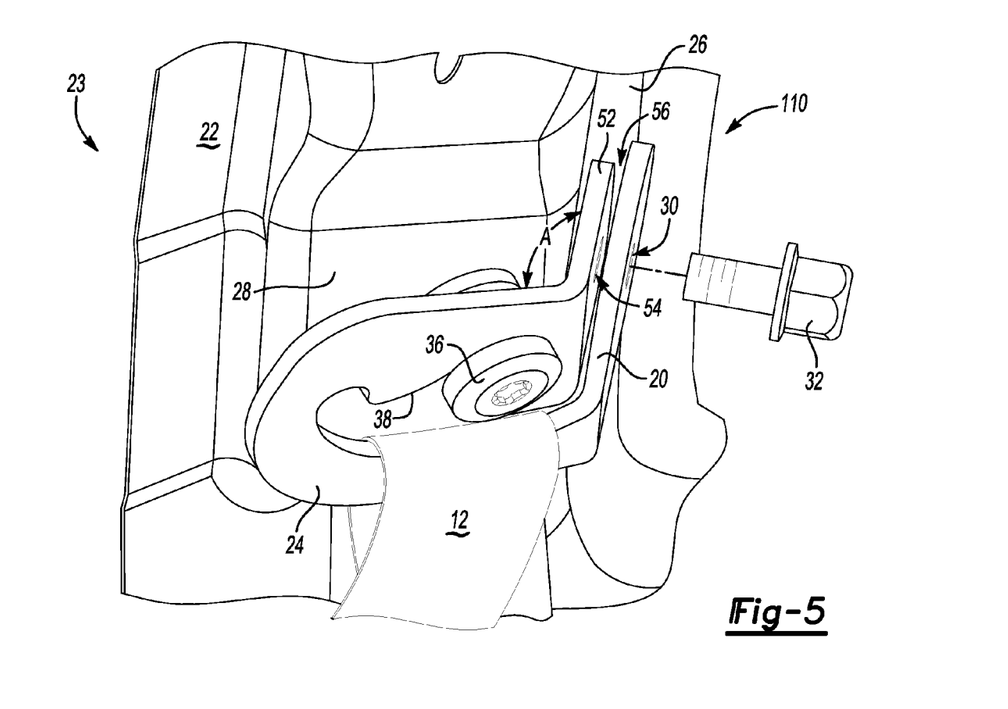
FIG. 5 is a second schematic perspective view of the unassembled guide loop of FIG. 4 in a position to be fixedly attached to a body of a vehicle.

Referring to FIG. 4, the guide loop 110 additionally includes a third portion 52 extending from the second portion 24 and substantially parallel to the first portion 20. Therefore, referring to FIG. 5, it is to be appreciated that the third portion 52 also extends from the second portion 24 at approximately the angle, A. As set forth above, the first portion 20 may be integral with the second portion 24 and crimped, e.g., bent, at the angle, A. Likewise, the second portion 24 may be integral with the third portion 52 and also crimped at the angle, A. Therefore, the second portion 24 may be integral with the first portion 20 and the third portion 52. Referring to FIGS. 4 and 5, the angle, A, may be selected according to a configuration of the body or pillar 22 of the vehicle 23. That is, the angle, A, may be selected so that both the first portion 20 and third portion 52 are each fixedly attachable to the first surface 26 of the body 22 of the vehicle 23, and the second portion 24 is fixedly attachable to the second surface 28 of the body 22 of the vehicle 23.

Referring again to FIG. 4, the first portion 20 may define at least one bore 30 therethrough that is configured for receiving the first fastener 32. The guide loop 110 is fixedly attachable to the body 22 of the vehicle 23 via at least the first fastener 32, as set forth in more detail below. Likewise, referring to FIG. 4, the second portion 24 of the guide loop 110 may define at least one bore 34 therethrough that is configured for receiving the second fastener 36. The second fastener 36 may be the same as or different from the first fastener 32.

Referring to FIG. 5, in another variation, the bore 34 on the second portion 24 may be configured as a notch 38 for abutting the second fastener 36. That is, a section of the second portion 24 may be cut-away to form the notch 38 so that the second portion 24 may rest on the second fastener 36.

Still referring to FIG. 5, the third portion 52 may define at least one bore 54 therethrough that is configured for receiving the first fastener 32. That is, the first fastener 32 may extend through at least the bores 30, 54 to fixedly attach the guide loop 110 to the body 22 of the vehicle 23. Therefore, the first fastener 32 may extend through the bores 30, 54 in one direction, indicated by arrow $D_1$ in FIG. 4, and the second fastener 36 may extend through the bore 34 in another direction, indicated by arrow $D_2$ in FIG. 4. Consequently, the guide loop 110 is not rotatable with respect to the body 22 of the vehicle 23, as set forth in more detail below.

Referring now to FIG. 5, the third portion 52 is spaced apart from the first portion 20 prior to attachment to the body 22 of the vehicle 23 so as to define a channel 56 that is configured for receiving the seat belt webbing 12 of the vehicle 23. That is, the third portion 52 may be configured and juxtaposed with respect to the first portion 20 to thereby close off the channel 56 and confine the seat belt webbing 12 when the third portion 52 and the first portion 20 are attached to the body 22. For example, during installation of the seat belt system in the vehicle 23, the seat belt webbing 12 may slide between the first portion 20 and the third portion 52 before the guide loop 110 is fixedly attachable to the body 22 of the vehicle 23, i.e., before the first fastener 32 is disposed in bores 30 and 54 or before the first fastener 32 and the second fastener 36 are disposed in the respective bores 30, 54, 34. Stated differently, the channel 56 provides an opening into which the seat belt webbing 12 may be inserted and released. Once the first fastener 32 is in place to fixedly attach the guide loop 110 to the body 22 of the vehicle 23, the third portion 52 closes off the channel 56 and confines the seat belt webbing 12 so that the seat belt webbing 12 may not be removed from the guide loop 110.

Referring again to FIG. 4, the second portion 24 may define the upper arm 44 and the lower arm 46 that is spaced opposite and apart from the upper arm 44. It is to be appreciated that the resulting area between the upper arm 44 and the lower arm 46 is a continuation of the channel 56 (FIG. 5) that is defined by the first portion 20 spaced apart from the third portion 52. The lower arm 46 includes the arcuate bearing surface 48 that is configured for slideably supporting the seat belt webbing 12. That is, in operation, the seat belt webbing 12 is supported by, and slides over, the arcuate bearing surface 48 of the lower arm 46. The seat belt webbing 12 may translate or slide along the entire length of the arcuate bearing surface 48 so as to optimize comfort of a vehicle occupant embraced by the seat belt webbing 12.

Referring again to FIG. 4, in one variation, the arcuate bearing surface 48 may include the element 50 configured for minimizing sliding friction of the seat belt webbing 12 with respect to the arcuate bearing surface 48. The element 50 may be, for example, a U-shaped sleeve that is disposed on the arcuate bearing surface 48.

Figure 6:
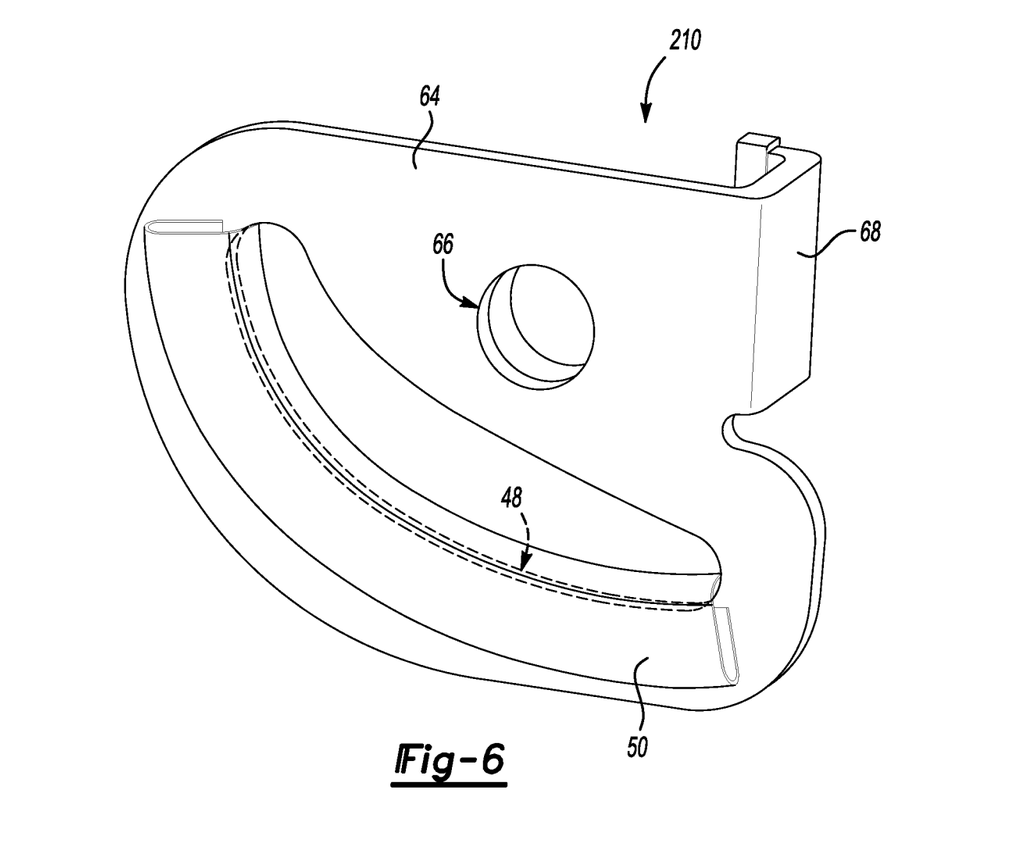
FIG. 6 is a schematic perspective view of a third embodiment of the guide loop of the present invention for a vehicle having a seat belt system that includes a height adjuster.
Figures 7, 8:
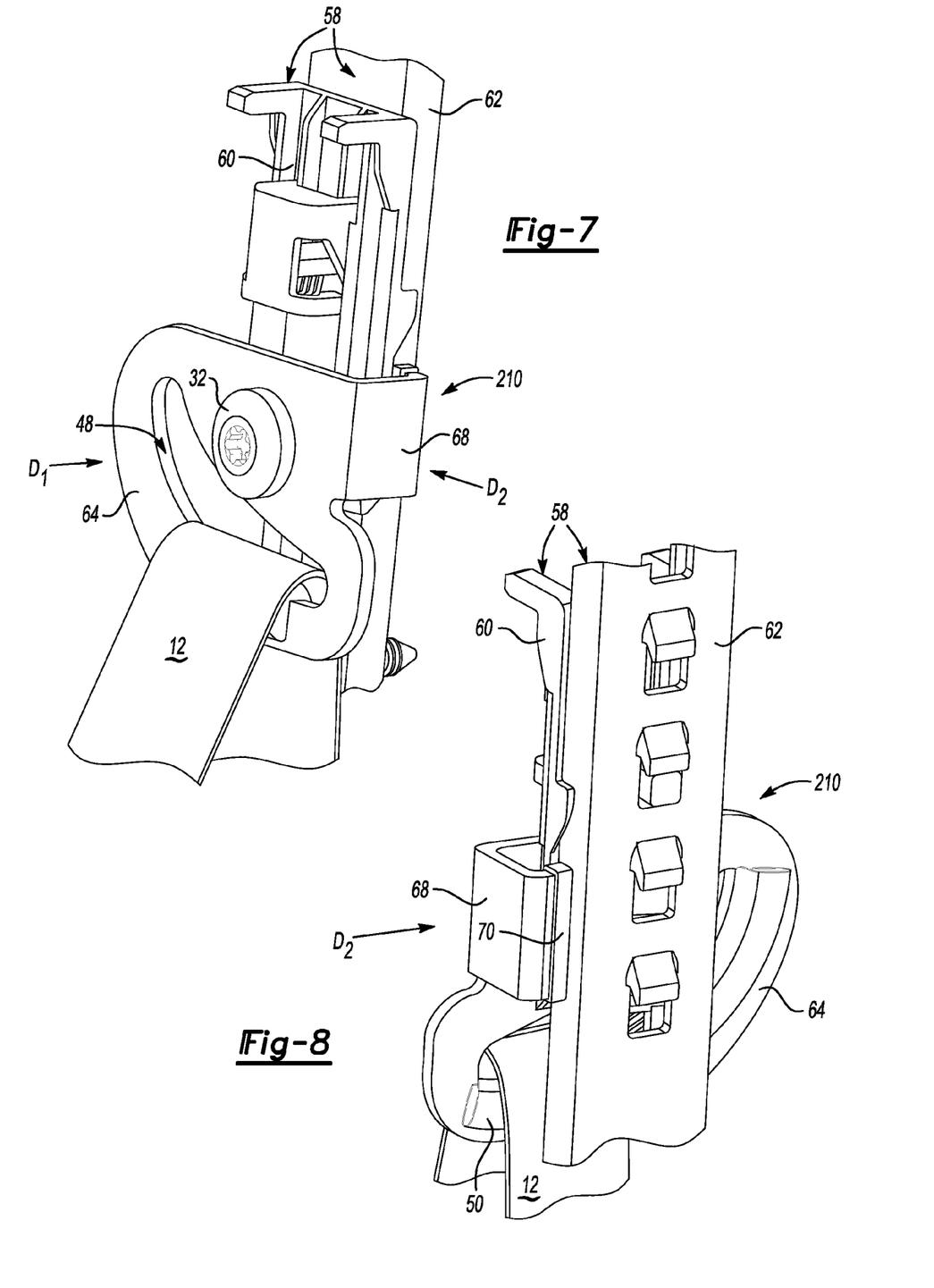
FIG. 7 is a schematic perspective front view of the guide loop of FIG. 6 fixedly attached to the height adjuster.
FIG. 8 is a schematic perspective rear view of the guide loop of FIGS. 6 and 7.

In a third embodiment, a guide loop 210 for a vehicle (not shown) having a seat belt system including a height adjuster 58 is shown in FIGS. 6-8, wherein the body of the vehicle is the height adjuster 58. By way of general background explanation and with reference to FIGS. 7 and 8, the height adjuster 58 typically includes one portion as a carriage 60 that is configured to vertically translate along another portion as a rail 62 that is anchored to the vehicle 23 (FIG. 3). In operation, an occupant of the vehicle 23 (FIG. 3) may adjust the height of the guide loop 210 by using the height adjuster 58 according to comfort preferences.

Referring to FIG. 6, the guide loop 210 includes a loop portion 64 configured for receiving and slideably supporting the seat belt webbing 12 (FIG. 7). That is, referring to FIG. 8, the loop portion 64 may define the arcuate bearing surface 48 that is configured for slideably supporting the seat belt webbing 12. And, as set forth above, the arcuate bearing surface 48 may include the element or covering 50 configured for minimizing sliding friction of the seat belt webbing 12 with respect to the arcuate bearing surface 48. Further, referring to FIG. 6, the loop portion 64 may define at least one bore 66 therethrough that is configured for receiving a fastener, e.g., the first fastener 32 (FIG. 7), for attachment of the guide loop 210 to the one portion 60 of the height adjuster 58. Referring to FIG. 7, the first fastener 32 may attach the guide loop 210 to the height adjuster 58 in one direction, indicated by arrow $D_1$. That is, the loop portion 64 may be configured for attachment to the height adjuster 58 in one plane generally perpendicular to the direction indicated by arrow $D_1$, and generally parallel to another direction indicated by arrow $D_2$ in FIG. 7.

Referring to FIG. 6, the guide loop 210 also includes a stop portion 68 configured for preventing rotation of the guide loop 210 with respect to the height adjuster 58 (FIG. 7). The stop portion 68 may be configured to attach the guide loop 210 to the height adjuster 58, e.g., to another portion 62. That is, the stop portion 68 may be configured for attachment to the height adjuster 58 in one plane generally parallel to the direction indicated by arrow $D_1$ in FIG. 7, and generally perpendicular to another direction indicated by arrow $D_2$ in FIG. 7.

The loop portion 64 and the stop portion 68 may be integral, as shown in FIGS. 6-8. Referring to FIGS. 7 and 8, the stop portion 68 may sufficiently abut the rail 62 of the height adjuster 58 so as to prevent rotation of the guide loop 210 with respect to the height adjuster 58. The stop portion 68 may extend from the loop portion 64 and be generally U-shaped. That is, the stop portion 68 may wrap around the carriage 60 and contact the rail 62 of the height adjuster 58. Alternatively, the stop portion 68 may snap to, or grab the carriage 60 and/or rail 62 to attach to the height adjuster 58.

Although not shown in FIGS. 7 and 8, the stop portion 68 may also extend from the loop portion 64 and be generally L-shaped. That is, the stop portion 68 may be configured for attachment to the height adjuster 58 via a friction fit.

In one variation, referring to FIG. 8, the stop portion 68 may include a stop 70 that abuts the rail 62. The stop 70 may contact, and align the stop portion 68 against the rail 62. The stop 70 may be formed from any suitable material, including, but not limited to, plastic, metal, composites, and combinations thereof. In one example, the stop 70 may be formed from the same material as the element 50 configured for minimizing sliding friction of the seat belt webbing 12 with respect to the arcuate bearing surface 48.

The guide loop 210 is fixedly attachable to the height adjuster 58. More specifically, the loop portion 64 is configured and fixedly attachable to the portions 60, 62 height adjuster 58 so that the guide loop 210 is not rotatable with respect to the height adjuster 58. Further, the stop portion 68 prevents rotation of the guide loop 210 with respect to the rail portion 62 of the height adjuster 58. Notably, an occupant of the vehicle 23 may still adjust the seat belt webbing 12 along the arcuate bearing surface 48 of the guide loop 210 according to comfort preferences, but the guide loop 210 is not rotatable with respect to the height adjuster 58.

As set forth above, the guide loops 10, 110, 210 are fixedly attachable to vehicle body parts such as the body or pillar 22 or the height adjuster 58 of the vehicle 23. Therefore, the guide loops 10, 110, 210 are configured so as not to be rotatable with respect to the body or pillar 22 or the height adjuster 58 of the vehicle 23. As such, the guide loops 10, 110, 210 may be installed flush with the body or pillar 22 or height adjuster 58 of the vehicle 23, and may be installed behind trim (not shown) of the vehicle 23. Consequently, the guide loops 10, 110, 210 allow for excellent closure to the trim of the vehicle 23.

Further, since the guide loops 10, 110, 210 are not rotatable, the guide loops 10, 110, 210 resist rattle during operation of the vehicle 23. Also, since the guide loops 10, 110, 210 may be integrally formed in one work piece, the guide loops 10, 110, 210 reduce vehicle manufacturing costs.

Additionally, the guide loops 10, 110, 210 maximize occupant comfort while allowing for decreased friction between the guide loops 10, 110, 210 and seat belt webbing 12 during retraction and/or extraction of the seat belt webbing 12. For example, the guide loops 10, 110, 210 minimize bunching, i.e., uncontrolled retraction, and dumping, i.e., uncontrolled extraction, of the seat belt webbing 12 during load limiting events, such as a deceleration of the vehicle 23.

While the best modes for carrying out the invention have been described in detail, those familiar with the art to which this invention relates will recognize various alternative designs and embodiments for practicing the invention within the scope of the appended claims.

The invention claimed is:

1. A guide loop for a vehicle seat belt system, the guide loop comprising:
   a first portion configured for attachment to a body of a vehicle in one plane, wherein said first portion defines at least a first bore therethrough that is configured for receiving a first fastener; and
   a second portion extending from said first portion at an angle and configured for attachment to the body of the vehicle in another plane, wherein said second portion includes:
   a lower arm defining an arcuate bearing surface; and
   an upper arm spaced apart from said lower arm and having a distal end spaced apart from said first portion to thereby define a channel therebetween that is not enclosed by said distal end and said lower arm;
   wherein said channel is configured for receiving a seat belt webbing of the vehicle onto said arcuate bearing surface and slideably releasing the seat belt webbing from said channel along said first portion;
   wherein said upper arm defines at least a second bore therethrough that is configured for receiving a second fastener;
   wherein the guide loop is fixedly attachable to and not rotatable with respect to the body of the vehicle.

2. The guide loop of claim 1, wherein said first portion is integral with said second portion.

3. The guide loop of claim 1, wherein said arcuate bearing surface includes an element configured for minimizing sliding friction of the seat belt webbing with respect to said arcuate bearing surface.

4. The guide loop of claim 1, wherein said first portion is configured to abut said body.

5. The guide loop of claim 4, wherein said first portion is configured for preventing rotation of said guide loop with respect to said body.

* * * * *